Aug. 21, 1934.  E. A. HOBART  1,970,854

MEANS AND METHOD OF CONTROL OF ELECTRIC WELDING CIRCUITS

Filed Nov. 14, 1932  2 Sheets-Sheet 2

INVENTOR
Edward A. Hobart.
BY
Toulmin & Toulmin
ATTORNEYS

Patented Aug. 21, 1934

1,970,854

UNITED STATES PATENT OFFICE 1,970,854

MEANS AND METHOD OF CONTROL OF ELECTRIC WELDING CIRCUITS

Edward A. Hobart, Troy, Ohio, assignor to The Hobart Bros. Company, Troy, Ohio, a corporation of Ohio Application November 14, 1932, Serial No. 642,592

12 Claims. (Cl. 219—8)

This invention relates to improvements in electric welding circuits, and means for varying the current and reactance in the circuit.

The current is varied, in the first instance, by varying or regulating the total amount of flux which passes through the generator armature, and the current and reactance is still further varied by inserting selectively in the circuit carrying the current a reactance. This reactance steadies the current and prevents the arc from breaking, and provides a more tenacious arc for welding purposes when the current is small. When the current is high the reactance is not necessary for the purpose of steadying the current and preventing the breaking of the arc.

It is possible to use, in connection with welding machines, heavy currents, due to improvements in electrodes, which are usually heavily coated and carry a much larger current than was formerly possible with bare electrodes. While it is important to have the highest efficiency at full load, when heavily coated electrodes are used, the amount of loss in the reactance is rather small when only small currents are being drawn from the welder and when small electrodes are being used.

It is important to have a welder which is uniform in its adaptability and which can be used for all types of electrodes, both bare and heavily coated.

It is also very necessary to have a reactance in the circuit when a small welding current is used, while it is not important when a heavy welding current is used. This is because it is much easier to maintain an arc when the current is large than when it is small and the arc is easily broken. It has thus been found advisable to have the reactance in the circuit when it is needed and the loss of the current in it is felt the least.

Figure 1:
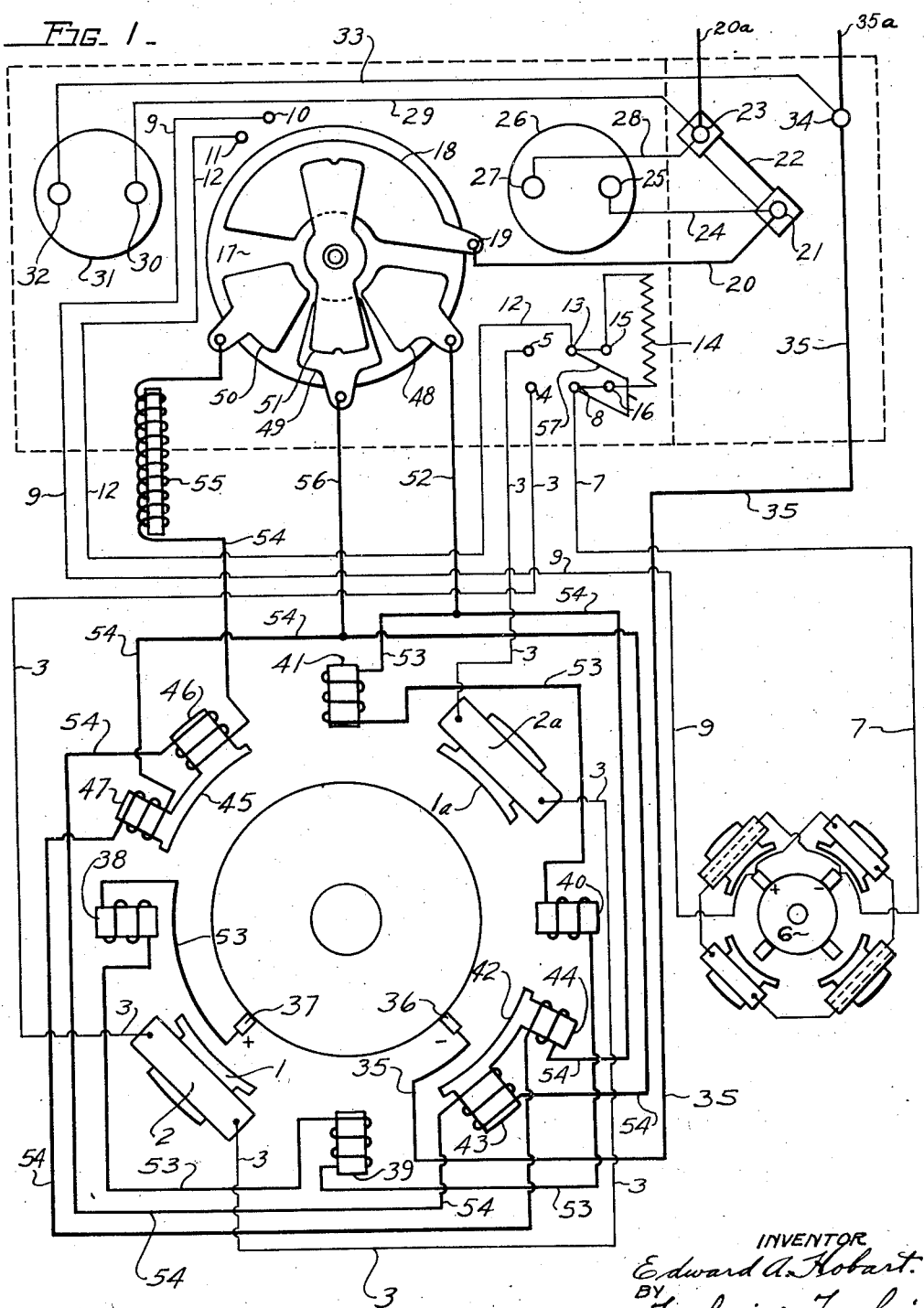

In Figure 1 there is illustrated diagrammatically one form for practicing applicant's invention using the reactance in the low range only.

Figure 2:
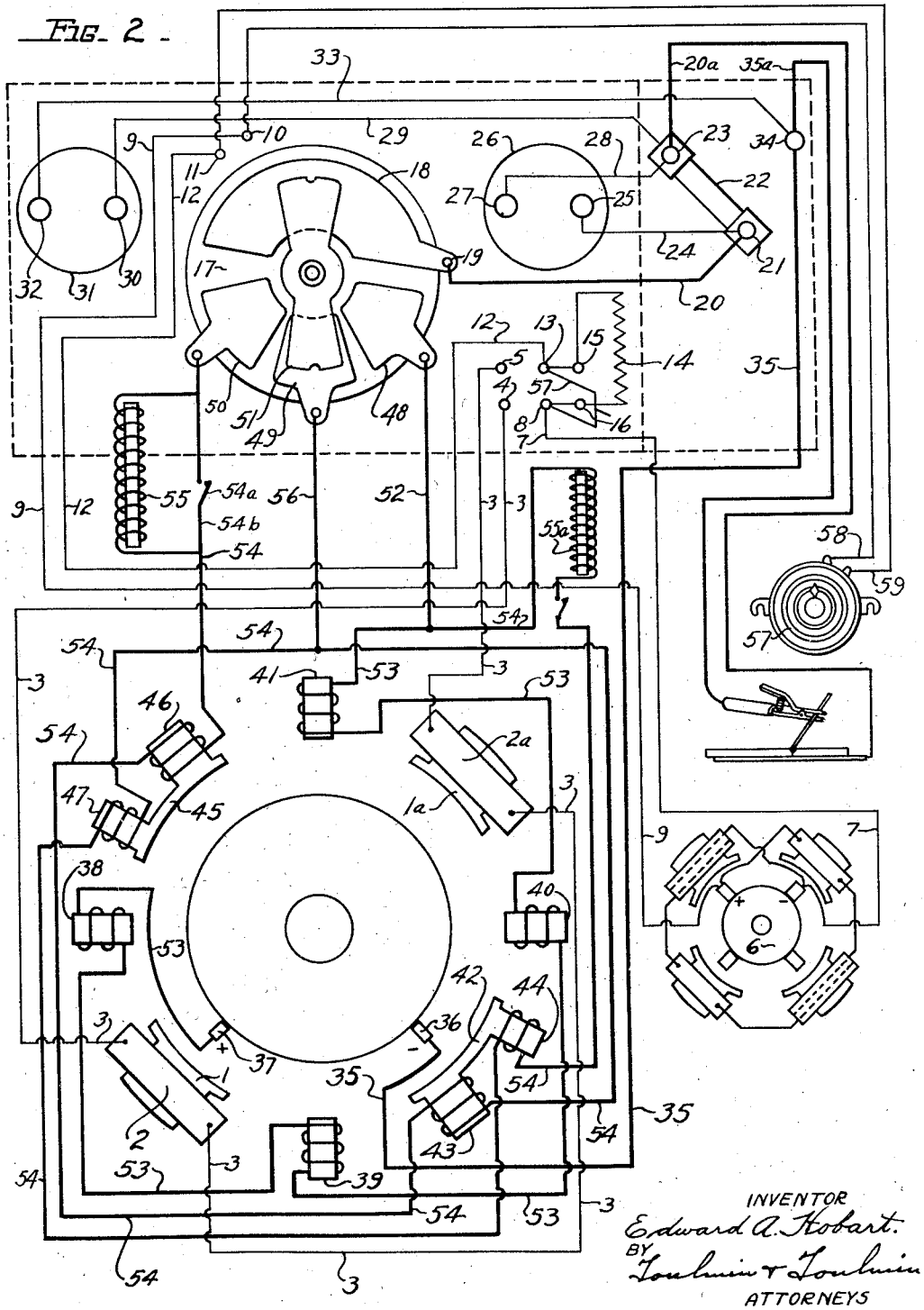

Figure 2 is a diagram similar to Figure 1 showing the addition of the field rheostat control and the reactance in both the low and intermediate ranges.

The numerals 1 and 1a represent the shunt poles, which have thereon shunt field windings 2 and 2a, respectively. These windings include a wire 3 extending from a terminal 4, through the windings, back to a terminal 5. The exciter shown diagrammatically is indicated by the numeral 6, and has extending from one part thereof a wire 7, which extends to a terminal 8 adjacent the terminal 4. Another wire 9 extends from the exciter and terminates in a terminal 10. Adjacent the terminal 10 is a terminal 11, connected by means of a wire 12 to a terminal 13 adjacent the terminal 8. 14 is a resistance connected at one end to a terminal 15 and at its other end to a terminal 16.

For controlling the welding current there is provided a selector switch 17, which has on one part thereof a relatively long contact plate 18, which has on one end a terminal 19 connected by means of a wire 20 to the terminal or welding lead stud 21. This stud is connected by means of a fuse 22 to a terminal 23, which is connected by means of a wire 28 to one terminal 27 of an ammeter. The other terminal 25 of the ammeter is connected by means of a wire 24 to the terminal or lead stud 21. The terminals 25 and 27 are parts of an ammeter 26.

The terminal 23 is also connected by means of a wire 29 to one terminal 30 of a voltmeter 31. The other terminal 32 of the voltmeter is connected by means of a wire 33 to a welding lead stud 34, which is connected by means of a wire 35 to one of the brushes 36 of a welding generator. The other brush of the welding generator is indicated by the numeral 37.

The generator is provided with intermediate poles 38 and 39, one on each side of the shunt pole 1, and with intermediate poles 40 and 41, one on each side of the shunt pole 1a. Between the intermediate poles 39 and 40 is a diverter pole 42, which has extending from one end thereof a large leg 43 and from the other end a smaller leg 44. These legs extend radially outwardly with respect to the armature, rotating within the generator. A second diverter pole 45 is located between the intermediate poles 38 and 41, and has a large leg 46 and a smaller leg 47 extending radially outwardly with respect to the armature shaft of the generator.

On the selector switch is a control plate 48 for heavy currents and a high welding range. There is also provided on this rheostat a plate 49 for an intermediate current condition and welding range, and also a plate 50 for low current and low welding range.

For making contact between the plate 18 and one of the plates 48, 49 or 50, there is provided a switch 51. To the plate 48 is connected one end of a wire 52. This wire is connected at its other end to two wires 53 and 54. The wire 53 is coiled around the poles 41, 40, 39 and 38 and terminates in a brush 37. The wire 54 extends from the wire 52 and passes around the legs 44, the leg 47, around the leg 43, leg 46 and is connected at its other end by means of a reactance 55 to the low plate 50.

The plate 49 has attached thereto one end of a wire 56, the other end of which is connected to the wire 54. The switch shown in connection with the terminals 4, 5, 8, 10, 15 and 16 is indicated by the numeral 57 and is thrown to the right for straight polarity and to the left for reverse.

When the switch 51 connects the plate 18 to the plate 48 the current passes from the plate 48, through wire 52, wire 53, around the poles 41, 40, 39 and 38, to the brush 37. This circuit is completed to the welder electrode and work through the wire 35 and the wires 20, 35a and 20a.

When the switch 51 connects plate 18 to plate 49 the current passes through the wire 56, wire 54, around leg 47, leg 44 to the wire 53, around the poles 41, 40, 39, 38 and to the brush 37. It will be observed that at this time the current passes about the intermediate poles and the smaller legs.

When the switch 51 connects plate 18 to plate 50, the current passes through the reactance coil 55, through the wire 54, around the larger legs 46 and 43, and around the smaller legs 47 and 44, to the wire 53, after which it passes around all of the intermediate poles and terminates in the brush 37.

At this time the whole welding current passes through all of the poles except the shunt poles, and also passes through the reactance. This current is a weak current and is stabilized by means of the reactance, and is used for light welding purposes. It is obvious from the foregoing that each of the currents does not pass through the reactance coil but is made to vary by varying the course the current takes through the various wires and around the various poles.

By selectively interposing in the circuit the diverter poles 47 or 46, or both, and their diverter pole windings wound thereon, the flux flowing through the armature and the shunt field poles 1 and 1a will be controlled, which thereby controls the amperage in the welder circuit in the wires 20a and 35a leading respectively to the work and the welding electrode. At the same time, when the diverter poles and their diverter pole windings are interposed in circuit so that the minimum flux is flowing through the armature and the shunt field poles, which is a low current condition, I selectively introduce into the circuit a reactor 55. If the arrangement is as shown in Figure 2 when the switch 51 is on the plate 50, I will have the same reactor 55a in circuit. If the switch plate 51 is on the intermediate position on plate 49, I will likewise have the reactor 55a in circuit, but if the switch member 51 is on the plate 48 where maximum current is flowing and where I have maximum amperage, then this reactor will not be necessary and will not be in circuit.

The line 54b controlled by the switch 54a may be utilized to shunt the reactance 55 out of the circuit.

Heretofore the disadvantage of the welding machine has been that the reactance has been in circuit all of the time whenever welding is being performed, with the consequence that there is a large amount of energy lost in the reactance, running as high as ten to twenty percent of the output of the machine. This was an unnecessary loss which was inevitable in the machine in order to have a steady arc when it was operating within a low current or intermediate current range.

By my invention I am enabled to have not only a selection of current ranges by the selector switch 51, but to simultaneously, selectively interpose in the circuit a reactance so as to bring the reactance in circuit when it is necessary and to eliminate it when it is unnecessary, as in the case of high current conditions. By this selector switch 51 I can control the amperage. At the same time I can eliminate the lost energy which has heretofore been characteristic of welding machines. I am therefore enabled to have the highest efficiency at full load.

I am enabled to maintain a steady arc at intermediate or low currents and during intermediate or low currents the amount of loss from the reactance is small, as only small currents are being drawn from the welder and usually small electrodes are being used.

This results in making it possible with my machine to use all types of electrodes, both bare and heavily coated electrodes. The bare electrodes are used with low or intermediate currents and the heavily coated electrodes are used with high currents with the result that welding can be speeded up and the work produced much faster.

When the reactance is used it maintains an arc when the current is small and the arc is easily broken. I thus place the reactance in the circuit when it is needed and when the loss of current in it is felt the least, while on the higher welding range where efficiency and current consumption counts for the most and where the arc is not easily broken the reactance is automatically entirely eliminated. I thus provide a machine whose efficiency is increased ten to twenty percent in the higher welding range and at the same time I have a machine which is universal in its adaptability for any type of electrode and for any amount of current output with the proper arc characteristics.

As will be seen in Figure 2, the amperage and voltage may have a fine adjustment by operating the field rheostat 57 which is connected by the wires 58 and 59 to the terminals 10 and 11. Within the range of amperage selected by the selector switch member 51 and any one of the plates 48, 49 and 50, the adjustment of the field rheostat in the exciter circuit will result in the adjustment of the amperage within the range so selected, at the same time permitting the full effect of the selectively included reactances 55 or 55a.

It will be further understood that the plate on which the welding generator operates for these selective controls of amperage is the control of the flux through the armature, the shunt field poles and the diverter poles by the interposition of the diverter pole windings successively in or out of circuit. The inter-poles 38, 39, 40 and 41 are for the purpose of providing a neutral point for the brushes in order to get good commutation.

It will be understood that I desire to comprehend within this invention such modifications as come within the scope of my claims and my invention.

Having thus fully described my invention, what I claim as new and desire to secure by Letters Patent, is:

1. In a method of controlling a welding circuit, generating a welding current, selectively determining the range of amperage of the current and interposing a reactance in the circuit to steady the arc in the lower amperage range only.

2. In a method of controlling a welding circuit, supplying the circuit with a welding current, determining the range of the welding current, and simultaneously selectively including in the circuit means to steady the arc in the lower ranges of the current in the circuit so supplied.

3. In a method of controlling a welding circuit, supplying the circuit with a welding current, determining the range of the welding current, and simultaneously selectively including in the circuit means to steady the arc in the lower ranges of the current in the circuit so supplied, and effecting a fine adjustment within the range of the amperage so selected in order to adapt the current to the requirements of the welding to be done.

4. In combination, a welding generator and a welding circuit having in circuit therewith a welding electrode and a work piece, means of selectively determining the range of amperage in the circuit, means for interposing in at least one of the lower ranges so selected a reactance to steady the arc, while prohibiting the reactance in higher amperage ranges where the steadying of the arc is unnecessary and the waste of current by the reactance is undesirable.

5. In combination, a welding generator and a welding circuit having in circuit therewith a welding electrode and a work piece, means of selectively determining the range of amperage in the circuit, means for interposing in at least one of the lower ranges so selected a reactance to steady the arc, while prohibiting the reactance in higher amperage ranges where the steadying of the arc is unnecessary and the waste of current by the reactance is undesirable, and means of effecting a fine adjustment of the amperage within the range of the amperage so selected to adjust the welding circuit to the condition of the particular welding work that is being done.

6. In combination in a welding apparatus, of shunt fields and shunt field poles, diverter poles and diverter pole windings adapted to control the flow of flux therethrough, means for selectively interposing said diverter poles and diverter pole windings in and out of circuit to control the amperage in the welding circuit, and a reactance in at least one of the lower ranges of amperage flowing in the circuit with at least one of the diverter pole windings for the steadying of the arc.

7. In combination, a welding apparatus an armature, shunt poles and shunt fields associated therewith, means to separately excite said fields, diverter poles and diverter pole windings, means to selectively interpose in circuit successively and in combination said windings, and means to steady the arc so produced selectively interposed when in position with said diverter pole windings, but out of circuit when said windings are out of circuit whereby the lower ranges of current have means to steady the arc and the upper range of current has no such means.

8. In combination, a welding apparatus, an armature, shunt poles and shunt fields associated therewith, means to separately excite said fields, diverter poles and diverter pole windings, means to selectively interpose in circuit successively and in combination said windings, and means to steady the arc so produced selectively interposed when in position with said diverter pole windings, but out of circuit when said windings are out of circuit whereby the lower ranges of current have means to steady the arc and the upper range of current has no such means, and means for effecting a fine adjustment of the amperage within the range so selected comprising an adjustable rheostat associated with the separate exciter means.

9. In combination, in a welding apparatus of an armature, shunt pole, shunt field windings, a separate exciter connected therewith, diverter poles, diverter pole windings adapted to control the amount of current and the flux flowing through the machine, means to selectively interpose said diverter pole windings in the welding machine circuit, a reactance associated with said diverter pole windings and selectively interposed in the circuit along with them, and an adjustable field rheostat interposed in the separate exciter circuit.

10. In combination, in a welding apparatus of an armature, shunt pole, shunt field windings, a separate exciter connected therewith, diverter poles, diverter pole windings adapted to control the amount of current and the flux flowing through the machine, means to selectively interpose said diverter pole windings in the welding machine circuit, a reactance associated with said diverter pole windings and selectively interposed in the circuit along with them, and an adjustable field rheostat interposed in the separate exciter circuit, and interpoles and inter-pole windings associated with said welding machine and the brushes thereof.

11. In a method of controlling the amperage range of a welding circuit which consists in controlling the flux through the welding machine and selectively interposing in certain lower ranges of the amperage so selected means of steadying the arc in a welding circuit so supplied.

12. In a method of controlling the amperage range of a welding circuit which consists in controlling the flux through the welding machine and selectively interposing in certain lower ranges of the amperage so selected means of steadying the arc in a welding circuit so supplied, furnishing separate excitation to the fields of the welding machine, and adjusting the separate excitation to secure the fine adjustment of the amperage of the circuit within the range so selected.

EDWARD A. HOBART.